US011921449B2

United States Patent

(12) United States Patent
Tanaka et al.

(10) Patent No.: US 11,921,449 B2
(45) Date of Patent: Mar. 5, 2024

(54) FIXING APPARATUS

(71) Applicant: CANON KABUSHIKI KAISHA, Tokyo (JP)

(72) Inventors: Kenichi Tanaka, Ibaraki (JP); Youichi Chikugo, Chiba (JP); Hidekazu Tatezawa, Saitama (JP); Rikiya Takemasa, Chiba (JP); Takeshi Kozuma, Tokyo (JP); Mikihiko Watanabe, Ibaraki (JP); Taku Ashida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/170,164

(22) Filed: Feb. 16, 2023

(65) Prior Publication Data

US 2023/0273557 A1 Aug. 31, 2023

(30) Foreign Application Priority Data

Feb. 28, 2022 (JP) ................................ 2022-028923
Feb. 28, 2022 (JP) ................................ 2022-028928

(51) Int. Cl.
*G03G 15/20* (2006.01)

(52) U.S. Cl.
CPC ................................ *G03G 15/2053* (2013.01)

(58) Field of Classification Search
CPC ........... G03G 15/2025; G03G 15/2028; G03G 15/2053; G03G 15/2057; G03G 15/206
See application file for complete search history.

(56) References Cited

U.S. PATENT DOCUMENTS 10,073,391 B2 * 9/2018 Onaka .................. G03G 15/206
2013/0189007 A1 * 7/2013 Ohtsu .................. G03G 15/206 399/329
2019/0243294 A1 * 8/2019 Tanaka ............... G03G 15/2064

FOREIGN PATENT DOCUMENTS

JP 2017181948 A 10/2017

* cited by examiner

*Primary Examiner* — Hoang X Ngo
(74) *Attorney, Agent, or Firm* — ROSSI, KIMMS & McDOWELL LLP

(57) ABSTRACT

A fixing apparatus includes a fixing belt, a slide member, an opposing member, and a retaining member. The retaining member includes, in a groove portion, a bottom surface portion that is in contact with an opposite surface of the slide member from a slide surface, a side surface portion that is formed on a downstream side of the groove portion in a conveyance direction and intersecting the bottom surface portion, and a continuous portion that is formed between the bottom surface portion and the side surface portion. The slide member includes an abutment portion configured to abut against the side surface portion at a position downstream from a downstream edge of the opposite surface when the slide member is slidden against the fixing belt such that the downstream edge of the opposite surface is positioned upstream from the continuous portion in the conveyance direction.

10 Claims, 8 Drawing Sheets

FIXING APPARATUS

BACKGROUND OF THE INVENTION

Field of the Invention

The present invention relates to a fixing apparatus preferably used in an image forming apparatus that utilizes an electrophotographic technique, such as a printer, a copying machine, a facsimile, or a multifunction machine.

Description of the Related Art

Image forming apparatuses are equipped with a fixing apparatus for fixing a toner image on a recording material by applying heat and pressure to the recording material on which the toner image is formed. The fixing apparatus includes a rotating endless fixing belt, a fixing pad arranged non-rotatably on an inner circumference side of the fixing belt, and a pressure roller abutting against an outer circumference surface of the fixing belt. In the fixing apparatus, the fixing belt is pressed by the fixing pad and the pressure roller, by which a fixing nip portion is formed between the fixing belt and the pressure roller, and heat and pressure is applied to the recording material passing through the fixing nip portion, by which the toner image is fixed to the recording material.

If frictional force between the fixing belt and the fixing pad is great, rotation of the fixing belt is obstructed. Thus, an apparatus including a slide member that slides against a fixing belt to reduce the frictional force between the fixing belt and the fixing pad at the fixing nip portion where the pressure is high is proposed (Japanese Patent Application Laid-Open Publication No. 2017-181948). Recently, a slide member having a plurality of projected portions formed on a surface thereof is used to reduce the frictional force between the fixing belt and the slide member.

In a fixing apparatus that includes a slide member having a plurality of projected portions formed on a surface thereof, a pad serving as a retaining member, and a fixing belt, the slide member must be fixed to the pad since the slide member and the pad are separate members. In a configuration where the slide member is fixed to the pad, the positioning of the slide member must be performed with high accuracy.

In consideration of the above-described problems, the present invention aims at positioning the slide member with high accuracy.

SUMMARY OF THE INVENTION

According to a first aspect of the present invention, a fixing apparatus includes a fixing belt having an endless shape and configured to rotate, a slide member including a slide surface configured to slide against an inner circumference surface of the fixing belt, an opposing member configured to form a fixing nip portion by nipping the fixing belt with the slide member, the fixing nip portion being configured to nip and convey a recording material in a conveyance direction and fix a toner image on the recording material, and a retaining member including a groove portion fitting the slide member therein, the groove portion retaining the slide member. The retaining member contacts the inner circumference surface of the fixing belt at a position downstream from the fixing nip portion in the conveyance direction. The retaining member includes, in the groove portion, a bottom surface portion that is in contact with an opposite surface of the slide member from the slide surface, a side surface portion that is formed on a downstream side of the groove portion in the conveyance direction and intersecting the bottom surface portion, and a continuous portion that is formed between the bottom surface portion and the side surface portion. The slide member includes an abutment portion configured to abut against the side surface portion at a position downstream from a downstream edge of the opposite surface in a state where the slide member is slidden against the fixing belt such that the downstream edge of the opposite surface is positioned upstream from the continuous portion in the conveyance direction.

Further features of the present invention will become apparent from the following description of exemplary embodiments with reference to the attached drawings.

DESCRIPTION OF THE EMBODIMENTS

A fixing apparatus according to a present embodiment will be described. At first, a general configuration of an image forming apparatus that is preferable for adopting the fixing apparatus according to the present embodiment will be described with reference to FIG. 1.

Image Forming Apparatus

An image forming apparatus 1 is a full-color printer adopting an electrophotographic system that includes four image forming units Pa, Pb, Pc, and Pd disposed to correspond to four colors, which are yellow, magenta, cyan, and black. The present embodiment is a tandem-type image forming apparatus 1 in which the image forming units Pa, Pb, Pc, and Pd are arranged along a direction of rotation of an intermediate transfer belt 204 described below. The image forming apparatus 1 forms a toner image on a recording material according to an image signal from a document reading apparatus 2 connected to an apparatus body 3 of the image forming apparatus 1 or a host apparatus such as a personal computer connected in a communicatable manner to the apparatus body 3. Examples of the recording material include paper, plastic films, cloths and other sheet materials.

Figure 1:
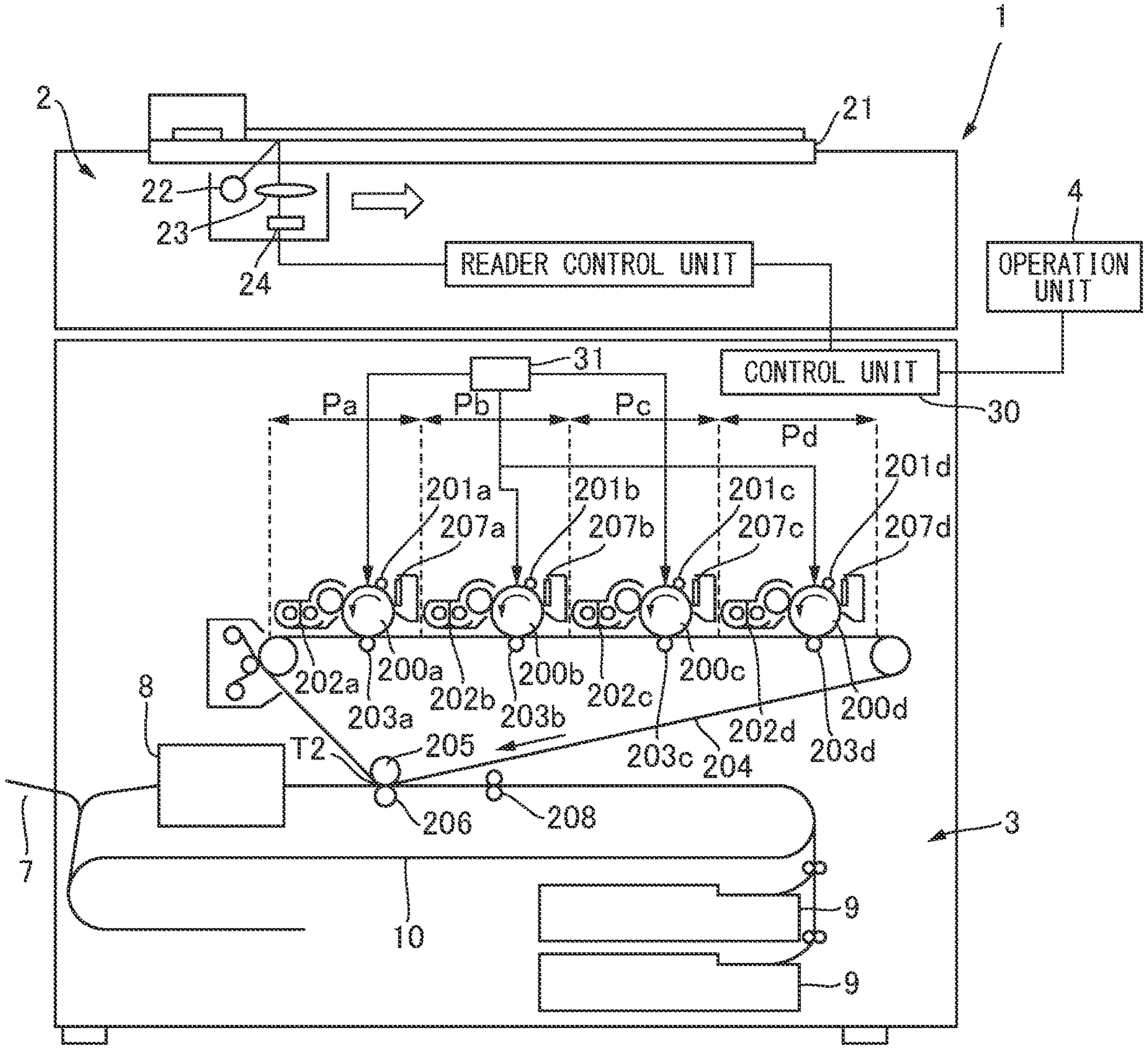
FIG. 1 is a schematic drawing illustrating an image forming apparatus that preferably adopts a fixing apparatus according to a present embodiment.

As illustrated in FIG. 1, the image forming apparatus 1 includes the document reading apparatus 2 and the apparatus body 3. The document reading apparatus 2 is an apparatus for reading a document placed on a platen glass 21, wherein light irradiated from a light source 22 is reflected on the document and an image is formed on a CCD sensor 24 through an optical member 23 such as a lens. When scanning is performed in the direction of an arrow under the control of a reader control unit, the optical unit reads the document per line and converts the same into an electric signal data string. The image signal obtained by the CCD sensor 24 is sent to the apparatus body 3, and image processing corresponding to the respective image forming units described below is performed in a control unit 30. Further, the control unit 30 receives external input as image signals from an external host apparatus such as a print server.

The apparatus body 3 is equipped with a plurality of image forming units Pa, Pb, Pc, and Pd, and image is formed in each image forming unit based on the above-mentioned image signals. That is, the image signals are converted into laser beams that have been subjected to pulse width modulation control (PWM) by the control unit 30. A polygon scanner 31 serving as an exposing unit scans laser beams corresponding to image signals. Then, laser beams are irradiated to photosensitive drums 200*a* to 200*d* serving as image bearing members of the respective image forming units Pa to Pd.

The image forming units form toner images of corresponding colors, wherein the image forming unit Pa forms a yellow (Y) toner image, the image forming unit Pb forms a magenta (M) toner image, the image forming unit Pc forms a cyan (C) toner image, and an image forming unit Pd forms a black (Bk) toner image. These image forming units Pa to Pd adopt an approximately identical configuration, such that the following description will describe the image forming unit Pa for forming a yellow (Y) toner image, and the descriptions on the other image forming unit Pb to Pd are omitted. In the image forming unit Pa, a toner image is formed on the surface of the photosensitive drum 200*a* based on image signals.

A charging roller 201*a* serving as a primary charger charges a surface of the photosensitive drum 200*a* to predetermined potential and prepares for the formation of an electrostatic latent image. The electrostatic latent image is formed on the surface of the photosensitive drum 200*a* charged to predetermined potential by laser beams from the polygon scanner 31. A developing unit 202*a* develops the electrostatic latent image on the photosensitive drum 200*a* and forms a toner image. A primary transfer roller 203*a* performs discharge from a rear side of the intermediate transfer belt 204, applies a primary transfer bias of opposite polarity as toner, and transfers the toner image on the photosensitive drum 200*a* to the intermediate transfer belt 204. The surface of the photosensitive drum 200*a* after transfer is cleaned by a cleaner 207*a*.

Further, the toner image on the intermediate transfer belt 204 is conveyed to the subsequent image forming units, where toner images of respective colors formed in each of the image forming units are sequentially transferred in the order of Y, M, C, and Bk, such that a four-color image is formed on the surface thereof. The toner image having passed through the image forming unit Pd of Bk which is positioned most downstream in a direction of rotation of the intermediate transfer belt 204 is conveyed to a secondary transfer portion T2 composed of a secondary transfer roller pair 205, 206. Thereafter, by having a secondary transfer electric field having opposite polarity as the toner image on the intermediate transfer belt 204 is applied at the secondary transfer portion T2, by which a toner image is secondarily transferred from the intermediate transfer belt 204 to the recording material.

The recording material is stored in a cassette 9, and the recording material fed from the cassette 9 is conveyed to a registration portion 208 composed of a pair of registration rollers, for example, where it stands by at the registration portion 208. Thereafter, the timing at the registration portion 208 is controlled such that the toner image on the intermediate transfer belt 204 corresponds to the paper position, and the recording material is conveyed to the secondary transfer portion T2.

The recording material having the toner image transferred thereto at the secondary transfer portion T2 is conveyed to a fixing apparatus 8, and heat and pressure is applied at the fixing apparatus 8, by which the toner image borne on the recording material is fixed to the recording material. The recording material having passed through the fixing apparatus 8 is discharged onto a sheet discharge tray 7. When forming images on both sides of the recording material, after completing transferring and fixing of a toner image to a first surface, i.e., front surface, the surface of the recording material is reversed via a reverse conveyance portion 10, and transferring and fixing of a toner image to a second surface, i.e., rear surface, of the recording material is performed before the recording material is stacked on the sheet discharge tray 7.

The control unit 30 performs control of the entire image forming apparatus 1, as described above. Further, the control unit 30 is capable of performing various settings based on an input from an operation unit 4 included in the image forming apparatus 1. The control unit 30 includes a Central Processing Unit (CPU), a Read Only Memory (ROM), and a Random Access Memory (RAM). The CPU performs control of various units by reading programs corresponding to the control procedures stored in the ROM. The RAM stores work data and input data, and the CPU refers to the data stored in the RAM based on the programs described above and performs control.

Fixing Apparatus

Figure 2B:
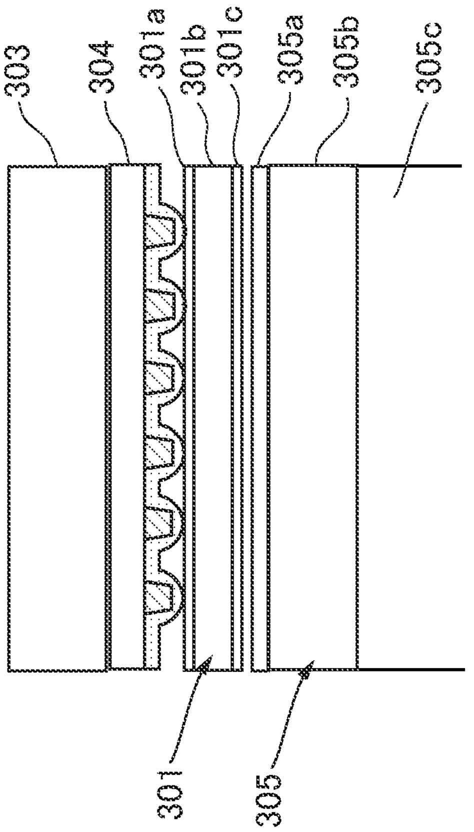
FIG. 2B is a cross-sectional view illustrating a fixing belt, a pressure roller, and a fixing pad unit.
Figure 2A:
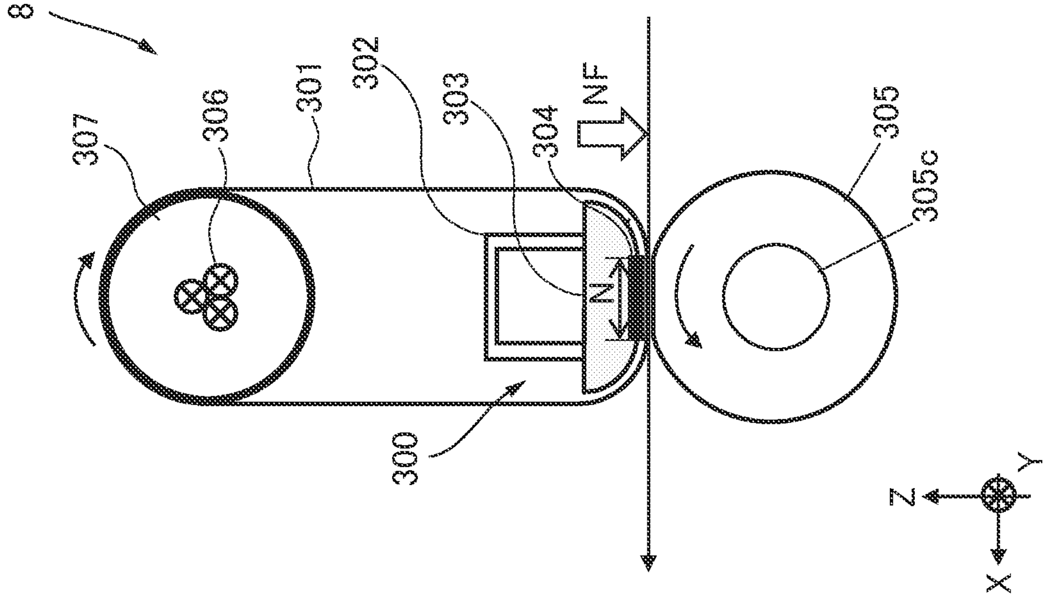
FIG. 2A is a schematic drawing illustrating the fixing apparatus.

Next, the configuration of the fixing apparatus 8 according to the present embodiment will be described with reference to FIGS. 2A to 4. In the present embodiment, a belt heating-type fixing apparatus utilizing an endless belt is adopted. As illustrated in FIG. 2A, in the fixing apparatus 8, the recording material is conveyed from right to left, i.e., arrow X direction. In the present specification, a width direction, i.e., longitudinal direction, refers to a direction intersecting a conveyance direction of the recording material in a fixing nip portion N, i.e., short direction, that is, refers to a rotational axis direction of a pressure roller 305.

The fixing apparatus 8 includes a fixing belt 301 that is endless and rotatable, the pressure roller 305 that abuts against the fixing belt 301 and that serves as an opposing member that forms the fixing nip portion N together with the fixing belt 301, a heating roller 307, and a fixing pad unit 300.

Fixing Belt

The fixing belt 301 is arranged in a replaceable manner in the fixing pad unit 300. The fixing belt 301 has thermal conductivity and heat-resisting property, and it is formed in a thin cylindrical shape. In the present embodiment, the fixing belt 301 adopts a three-layer structure in which a base layer 301*a* is disposed on an inner circumference side, an elastic layer 301*b* is arranged on an outer circumference of the base layer 301*a*, and a release layer 301*c* is formed on an outer circumference thereof, as illustrated in FIG. 2B. As an example, the base layer 301*a* has a thickness of "80 μm" and is formed of polyimide resin (PI), the elastic layer 301*b* has a thickness of "300 μm" and is formed of silicone rubber, and the release layer 301*c* has a thickness of "30 μm" and is formed of tetrafluoro-ethylene-perfluoro alkoxy ethylene copolymer resin (PFA). The outer diameter of the fixing belt 301 is set to "150 mm", for example. The fixing belt 301 configured as described above is arranged in a stretched manner by the heating roller 307 and the fixing pad unit 300. The fixing belt 301 is an example of a fixing belt having an endless shape and configured to rotate.

Pressure Roller

The pressure roller 305 is supported rotatably on a fixing frame (not shown) of the fixing apparatus 8, wherein a gear (not shown) is fixed to one end portion thereof in a width direction, and the pressure roller 305 is driven to rotate by being connected via the gear to a drive source such as a motor (not shown). In a state where the pressure roller 305 is rotated, rotational force of the pressure roller 305 is transmitted to the fixing belt 301 by frictional force generated at the fixing nip portion N. Thereby, the fixing belt 301 is rotated following the rotation of the pressure roller 305. That is, the pressure roller 305 is an example of an opposing member configured to form a fixing nip portion N by nipping the fixing belt 301 with the slide member 304. The fixing nip portion N is configured to nip and convey a recording material in the conveyance direction and fix a toner image on the recording material.

The pressure roller 305 has an elastic layer 305*b* formed on an outer circumference of a rotation shaft 305*c*, and a release layer 305*a* is formed on an outer circumference of the elastic layer 305*b*, as illustrated in FIG. 2B. As an example, the rotation shaft 305*c* is formed of a stainless steel (SUS) having a diameter of "72 mm", the elastic layer 305*b* is formed of a conductive silicone rubber having a thickness of "8 mm", and the release layer 305*a* is formed of a PFA having a thickness of "100 μm".

As illustrated in FIG. 2A, the pressure roller 305 abuts against an outer circumference surface of the fixing belt 301 so as to nip the fixing belt 301 with a slide member 304 described below, and forms the fixing nip portion N for nipping and conveying the recording material in a conveyance direction, i.e., arrow X direction, where the toner image is fixed to the recording material. Therefore, the pressure roller 305 is pressed toward the fixing pad unit 300 via the fixing belt 301 by a driving source not shown. In the present embodiment, for example, the pressure roller 305 abuts against the fixing belt 301 so that a pressure obtained at the fixing nip portion N (NF) is "1600 N", a conveyance direction length of the fixing nip portion N is "24.5 mm", and a width direction length thereof is "326 mm". In the present embodiment, the pressing direction in which the pressure roller 305 presses the fixing belt 301 is referred to as a Z direction. The pressing direction is a direction intersecting the conveyance direction, i.e., X direction, and the width direction, i.e., Y direction, and according to the present embodiment, it is a direction orthogonal thereto. The pressing direction is a direction in which the fixing belt 301 and the pressure roller 305 mutually press each other, and it includes both a case in which the pressure roller 305 presses the fixing belt 301 and a case in which the fixing belt 301 presses the pressure roller 305.

Heating Roller

The heating roller 307 is arranged on an inner circumference side of the fixing belt 301, and stretches the fixing belt 301 together with the fixing pad unit 300. The heating roller 307 is formed in a cylindrical shape of metal such as aluminum and stainless steel, and a halogen heater 306 serving as a heat source for heating the fixing belt 301 is arranged in the inner side thereof. The heating roller 307 is heated to a predetermined temperature by the halogen heater 306.

In the present embodiment, the heating roller 307 is formed of an aluminum pipe having a thickness of "1 mm", for example, from the viewpoint of thermal conductivity, and a surface layer thereof is subjected to anodizing treatment. The number of the halogen heater 306 can be one, but from the viewpoint of facilitating temperature distribution control of the heating roller 307 in the rotational axis direction, i.e., width direction, a plurality of halogen heaters 306 are desirably provided. The plurality of halogen heaters 306 have mutually varying light distributions in the width direction, and according to the size of the recording material, a lighting ratio is controlled by the control unit 30 (refer to FIG. 1). In the present embodiment, three halogen heaters 306 are arranged. The heat source is not limited to halogen heaters, and other heaters such as carbon heaters that can heat the heating roller 307 can be used.

The heating roller 307 can have a pivot axis arranged either on one end or near a center of the rotational axis direction, i.e., width direction, and that swings so as to generate a tension difference between one side and the other side of the fixing belt 301 in the width direction to thereby move the fixing belt 301 in the width direction. That is, the fixing belt 301 may be skewed to one side of the end portions in the width direction, which is so-called belt skew, during rotation, due to a diametral accuracy of the heating roller 307 stretching the belt or an alignment accuracy with a fixing pad 303 described later. Therefore, by swinging the heating roller 307, the position of the fixing belt 301 in the rotational axis direction, i.e., skew position, is controlled. Further, the heating roller 307 is urged by a spring supported on a frame (not shown) of the fixing apparatus 8, and it can also serve as a tension roller for applying a predetermined tension to the fixing belt 301.

Fixing Pad Unit

Next, the fixing pad unit 300 will be described. As illustrated in FIG. 2A, the fixing pad unit 300 includes a fixing stay 302, the fixing pad 303, and the slide member 304, which are arranged on an inner circumference side of the fixing belt 301. The fixing stay 302 is a rigid member made of metal, for example, that extends in the width direction along the fixing belt 301, and the fixing stay 302 supports the fixing pad 303 from the side of the pressure roller 305.

In the present embodiment, the fixing belt 301 is pressed toward the pressure roller 305 from the inner circumference side by the fixing pad 303 supported on the fixing stay 302. Thereby, the fixing nip portion N having a wide nip with sufficient conveyance direction length and width direction length is formed between the pressure roller 305 and the fixing belt 301. Further, by having the fixing pad 303 made of resin supported by the fixing stay 302 made of metal having a greater rigidity, deflection of the fixing pad 303 caused by the pressure received during pressing operation is reduced, such that a uniform fixing nip width in the width direction can be obtained.

Fixing Pad

The fixing pad 303 serving as a retaining member is disposed non-rotatably on an inner circumference side of the fixing belt 301 and includes a groove portion 303*f* (refer to FIG. 4) capable of fitting the slide member 304 having a long length therein, and retains the slide member 304 in contact with the inner circumference surface of the fixing belt 301. The fixing pad 303 is a resin member that extends in the width direction, and the width direction length of the fixing pad 303 is longer than the width direction length of a maximum-sized recording material on which image can be formed. The fixing pad 303 is formed of resin having insulation and heat-resisting properties, such as a liquid crystal polymer resin (LCP). The fixing pad 303 is a molded product that is manufactured by injection-molding such resin material using a mold. The fixing pad 303 is an example of a retaining member including a groove portion 303*f* fitting the slide member 304 therein. The groove portion 303*g* retains the slide member 304. The fixing pad 303 contacts the inner circumference surface of the fixing belt 301 at a position downstream from the fixing nip portion N in the conveyance direction.

Figure 4:
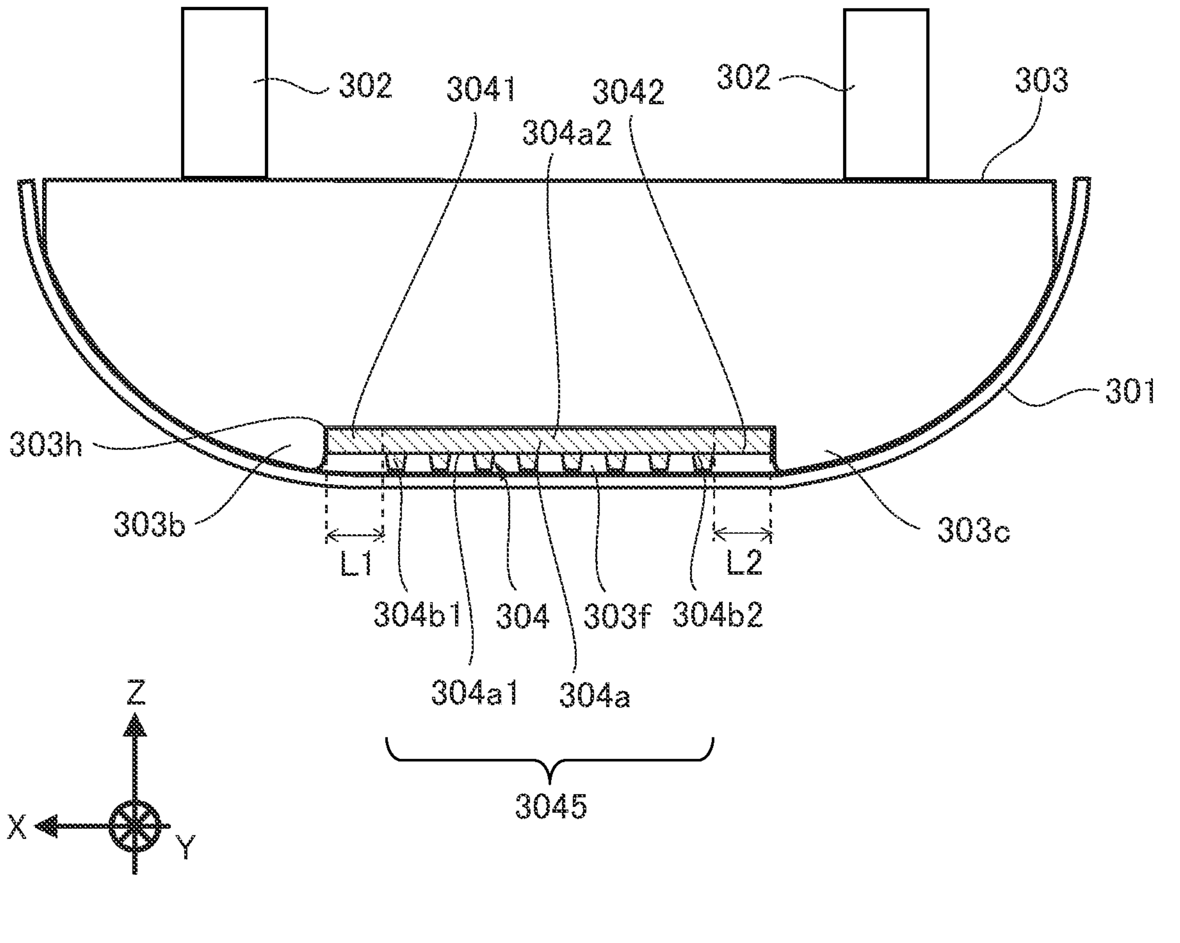
FIG. 4 is a cross-sectional view illustrating a vicinity of a fixing nip portion.

As illustrated in FIG. 4, the fixing pad 303 includes, with respect to the conveyance direction, an upstream-side guide portion 303*c* that abuts against the fixing belt 301 on an upstream side of a bottom surface 303*h* of the groove portion 303*f*, and a downstream-side guide portion 303*b* that abuts against the fixing belt 301 on a downstream side of the bottom surface 303*h*. The bottom surface 303*h* is a surface that contacts an opposite surface 304*a*2 opposite to a slide surface of the slide member 304, i.e., a tip of the projected portions. The upstream-side guide portion 303*c* guides the fixing belt 301 toward the fixing nip portion N, and the downstream-side guide portion 303*b* guides the fixing belt 301 that had passed through the fixing nip portion N toward the fixing stay 302 away from the fixing nip portion N. The upstream-side guide portion 303*c* and the downstream-side guide portion 303*b* abut against the fixing belt 301 across the entire area of a sheet passing area in the width direction through which a maximum-sized recording material on which image can be formed passes in the fixing nip portion N.

Slide Member

If frictional force between the fixing belt 301 and the fixing pad 303 is great, the rotation of the fixing belt 301 is obstructed. Therefore, according to the present embodiment, as illustrated in FIG. 2A, the fixing pad 303 is provided with the slide member 304 that slides against the fixing belt 301 so as to reduce the frictional force between the fixing belt 301 and the fixing pad 303 at the fixing nip portion N where pressure is high. The slide member 304 is arranged at a position opposing the pressure roller 305 interposing the fixing belt 301 in a state retained by the fixing pad 303. In the present embodiment, the slide member 304 is retained by the fixing pad 303 such that a short direction thereof corresponds to the conveyance direction.

The slide member 304 has a heat-resisting property and strength, and is provided with a slide surface that abuts against the inner circumference surface of the fixing belt 301 being rotated and slides against the fixing belt 301 in a state retained by the fixing pad 303. By interposing the slide member 304 between the fixing pad 303 and the fixing belt 301, frictional force between the fixing pad 303 and the fixing belt 301 is reduced, such that the rotation of the fixing belt 301 is not obstructed by the fixing pad 303. A lubricant for smoothly sliding the fixing belt 301 against the slide member 304 can be applied on the inner circumference surface of the fixing belt 301. For example, a silicone oil can be used as the lubricant.

As described above, according to the present embodiment, frictional force between the fixing pad 303 and the fixing belt 301 is reduced by the slide member 304, and according to the present embodiment, the slide member 304 has a slide surface that slides against the fixing belt 301 formed in a concave-convex shape or an embossed shape, as illustrated in FIG. 2B.

The slide member 304 is formed of a metal material such as stainless steel (SUS), copper, or aluminum. In the case of the present embodiment, a stainless steel (SUS) having a thickness of "1 mm" is used to form the slide member 304. The slide member 304 is not limited to metal, and it can be formed using engineering plastics such as polyimide resin (PI), polyether ether ketone resin (PFFK), or LCP (liquid crystal polymer resin).

Figure 3A:
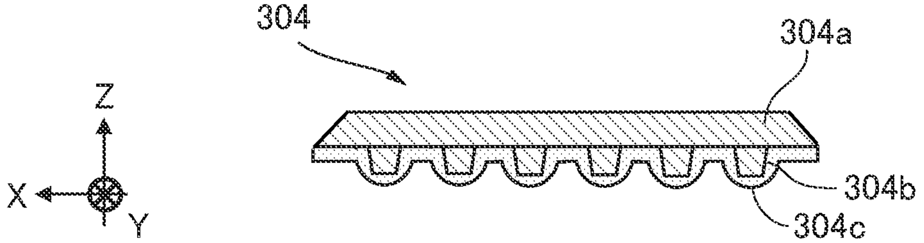
FIG. 3A is a schematic drawing illustrating a slide member.
Figure 3B:
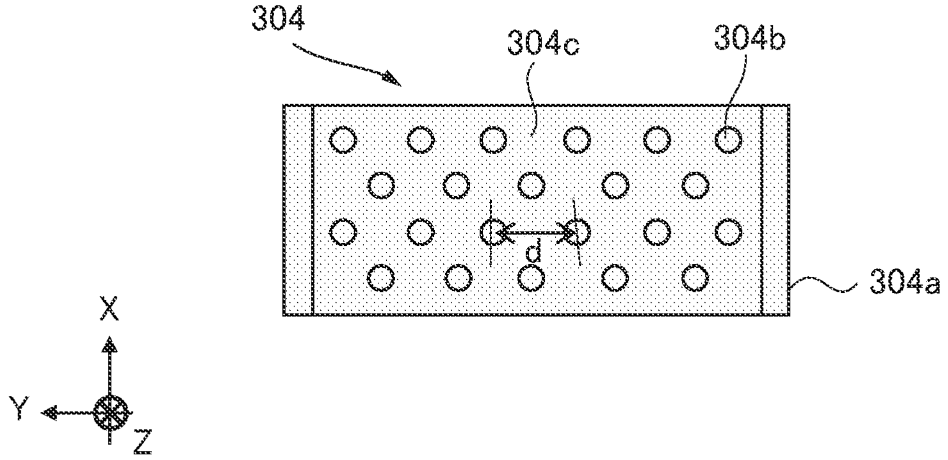
FIG. 3B is a top view illustrating the slide member.

As illustrated in FIGS. 3A and 3B, the slide member 304 includes a plate-shaped base 304*a*, and a plurality of projected portions 304*b* that protrude from the base 304*a* and slide against the fixing belt 301. As illustrated in FIG. 3A, the projected portions 304*b* protrude from a surface of the base 304*a*. The projected portions 304*b* have an amount of protrusion, that is, Z direction height, from the surface of the base 304*a* of "250 μm", for example. Further, as illustrated in FIG. 3B, the projected portions 304*b* are arranged on the base 304*a* such that distances between adjacent projected portions are approximately the same in the conveyance direction and distances between adjacent projected portions are approximately the same in the width direction. The distance, i.e., pitch, d between adjacent projected portions 304*b* is "1.4 mm", for example, in both the conveyance direction and the width direction. That is, the projected portions 304*b* are examples of a plurality of projections that protrude toward the pressure roller 305 on a side that slides against the fixing belt 301 and slide against the inner circumference surface of the fixing belt 301.

Further, a low friction layer 304*c* for reducing frictional force generated between the fixing belt 301 is provided on the surface of the slide member 304 using polytetrafluoroethylene resin (PTFE), or PFA, for example. In the present embodiment, a PTFE with a thickness of "20 μm" is coated on the surface of the base 304*a* and the projected portions 304*b*.

As illustrated in FIG. 4, in the present embodiment, the surface of the slide member 304 is formed in a concave-convex shape, and the slide member 304 slides against the fixing belt 301 at the tip surface of the projected portions 304*b*. Thereby, the contact area between the slide member 304 and the fixing belt 301 is reduced, and the frictional force generated between the fixing belt 301 is reduced. Further, since the low friction layer 304*c* is coated on the surface of the projected portions 304*b*, the frictional force generated between the fixing belt 301 is also reduced thereby.

As described above, the fixing pad 303 retains the slide member 304 such that the inner circumference surface of the fixing belt 301 slides against the tip surface of the projected portions 304*b*. In order to do so, the groove portion 303*f* having a recessed shape is formed on the fixing pad 303 for fitting and retaining the slide member 304 on the opposite side from the side being supported by the fixing stay 302. The fixing pad 303 is manufactured by injection-molding a resin material using a mold.

Here, as described above, if the height of the plurality of projected portions 304*b* on the slide member 304 is not uniform, pressure unevenness may be generated in the fixing nip portion N and fixing failures of the recording material may occur. The height difference of the projected portions 304*b* that causes fixing failures is, for example, approximately 20 to 50 μm. In order to prevent fixing failures of the recording material caused by the height of the projected portions 304*b*, for example, a contactless inspection apparatus by laser scanning is used to measure the heights of the plurality of projected portions 304*b* and perform inspection of the slide member 304. The contactless inspection apparatus measures the heights of the projected portions 304*b* by a line scanning sensor, called a scan sensor, using laser light, and compares the measured values with a reference value that is provided in a projected portion shape profile prepared in advance. Then, if the difference between the measured values and the reference value is within a predetermined range, such as 15 μm or less, it is determined that the slide member 304 is a good product. The slide member 304 that is not determined as a good product will not be used.

When the slide member 304 is formed of a base material such as stainless steel, the slide member 304 may be warped from a center portion in the width direction, i.e., longitudinal direction, due to the accuracy of the base material or the residual stress during processing of the base material. The difference in heights of the end portions and the center portion in the width direction caused by warping is approximately "2 mm", for example, though it may vary among the individual slide members 304. If the slide member 304 is warped, it is difficult to measure the height of the projected portions 304*b* using the contactless inspection apparatus with high accuracy, so that it is necessary to measure the height of the projected portions 304*b* after straightening the warping of the slide member 304. In order to straighten the warping of the slide member 304, the slide member 304 is nipped between and fixed, i.e., clamped, by the surface plate 500 and clamp members 501, as described below.

As illustrated in FIG. 4, the slide member 304 according to the present embodiment includes first areas (3041, 3042) at each of both end portions in the conveyance direction and a second area 3045 between the first areas in the conveyance direction. The first areas includes a first planar area 3041 and a second planar area 3042 on either end portions in the conveyance direction, i.e., short direction, where projected portions 304*b* are not formed. The first planar area 3041 is an example of an end portion area, and it is a flat portion area from a downstream edge of the base 304*a* to a most downstream projected portion 304*b*1 that is formed most downstream among the plurality of projected portions 304*b* in the conveyance direction. The second planar area 3042 is an example of an end portion area, and it is a flat portion area from an upstream edge of the base 304*a* to a most upstream projected portion 304*b*2 that is formed most upstream among the plurality of projected portions 304*b* in the conveyance direction. According to the present embodiment, in a state where the slide member 304 is retained by the fixing pad 303, the first planar area 3041 and the second planar area 3042 are in contact with the bottom surface 303*h* of the groove portion 303*f* of the fixing pad 303, similar to the base 304*a*.

In the present embodiment, the first planar area 3041 and the second planar area 3042 are clamped, such that the heights of the projected portions 304*b* are measured in a state where the warping of the slide member 304 is straightened. The first planar area 3041 and the second planar area 3042 are formed to have a length (L1, L2) that allows clamping to be performed without interfering with the projected portions 304*b* in the conveyance direction. For example, the first planar area 3041 is formed to have a length "L1" that is "0.5 mm" or more from a first end portion positioned most downstream of the base 304*a* in the short direction, i.e., conveyance direction. Similarly, the second planar area 3042 is formed to a have a length "L2" that is "0.5 mm" or more from a second end portion positioned most upstream of the base 304*a* in the short direction, i.e., conveyance direction. Thereby, the heights of the projected portions 304*b* can be measured with high accuracy in a state where the warping of the slide member 304 is straightened.

In order to clamp the slide member 304 reliably and straighten the warping thereof, the conveyance direction length of the first planar area 3041 and the second planar area 3042 is preferably "1.0 mm" or more. Further, the first planar area 3041 and the second planar area 3042 are preferably formed across the entire area in the width direction, i.e., entire area in the longitudinal direction, of the slide member 304.

Figure 5A:
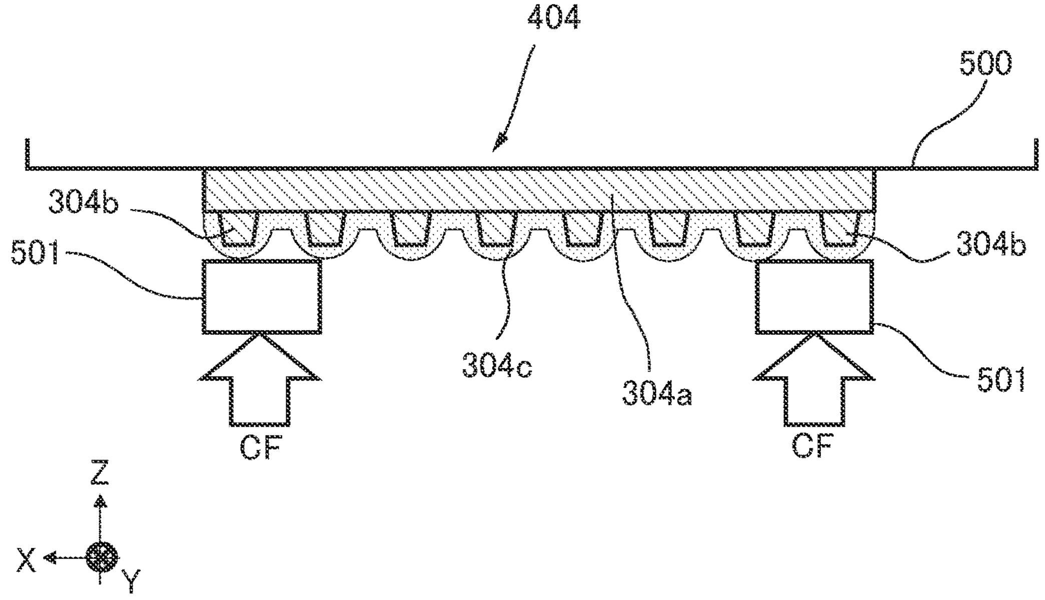
FIG. 5A is a schematic diagram illustrating a clamped state of the slide member in a case where a slide member according to a comparative example is used.
Figure 5B:
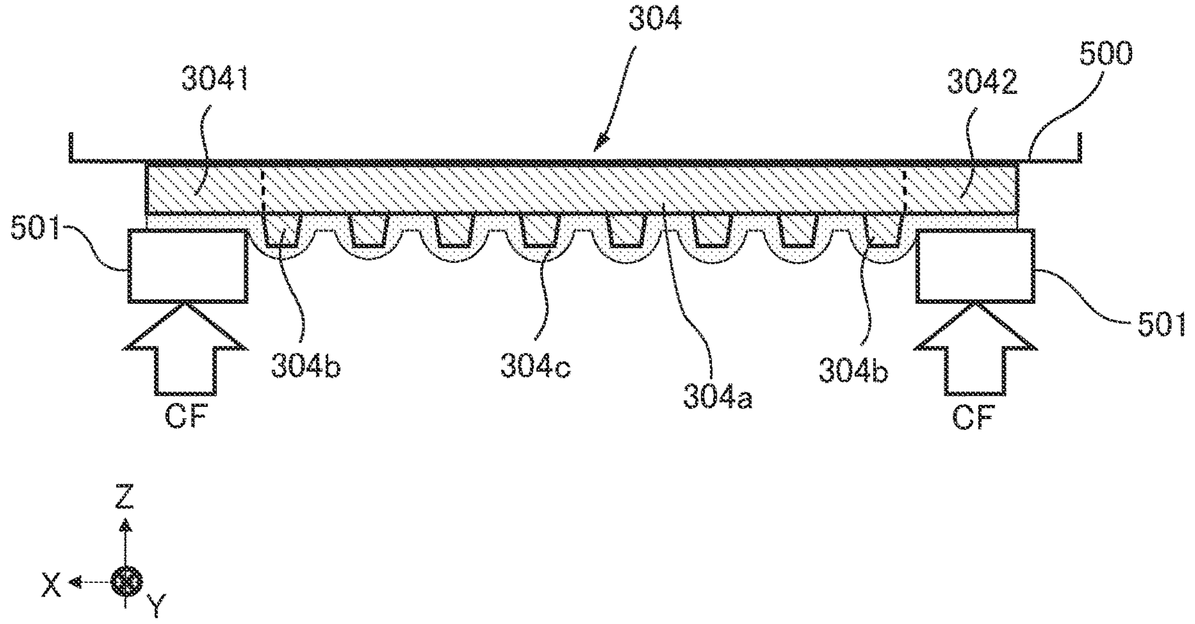
FIG. 5B is a schematic diagram illustrating a clamped state of the slide member in a case where the slide member according to the present embodiment is used.

FIG. 5A illustrates a clamped state in a case where a slide member 404 according to a comparative example is used, and FIG. 5B illustrates a clamped state in a case where the slide member 304 according to the present embodiment is used. In general, the warping of the slide member (404, 304) is straightened by having a partial area of the slide member nipped between clamp members 501 and a surface plate 500 and pressed against the surface plate 500 by the clamp members 501. If the thickness of the base 304*a* is "1.0 mm", for example, a clamping force (CF) by the clamp members 501 that is required to straighten the warping of the slide member (404, 304) is set to approximately "2 to 4 N".

As illustrated in FIG. 5A, the slide member 404 according to the comparative example does not include a flat portion area, such as the first planar area 3041 or the second planar area 3042, that can be clamped by the clamp member 501, unlike the slide member 304 according to the present embodiment. In the slide member 404, an area including a part of the plurality of projected portions 304*b* is pressed against the surface plate 500 by the clamp members 501. As for the projected portions 304*b* that are in the area pressed by the clamp members 501, measurement of the heights thereof by the scan sensor is difficult since the clamp members 501 interfere therewith. Further, the tips including the low friction layer 304*c* of the projected portions 304*b* pressed by the clamp members 501 may be damaged or dented.

Meanwhile, as illustrated in FIG. 5B, according to the slide member 304 of the present embodiment, the first planar area 3041 and the second planar area 3042 in which the projected portions 304*b* are not formed is pressed against the surface plate 500 by the clamp members 501. The first planar area 3041 and the second planar area 3042 are flat portion areas in which the projected portions 304*b* are not formed. Therefore, the clamp members 501 do not interfere with the measurement, unlike the comparative example, such that the heights of all the projected portions 304*b* on the slide member 304 can be measured correctly by the scan sensor.

In the case of the slide member 304 of the present embodiment, as illustrated in FIG. 4, the first planar area 3041 and the second planar area 3042 are formed out of the range of the fixing nip portion N so as not to contact the fixing belt 301. Therefore, even if minute scratches or dents are formed on the first planar area 3041 and the second planar area 3042 by being pressed by the clamp members 501, the fixing of toner image on the recording material is not affected in any way.

As described above, from the viewpoint of clamping the slide member 304 infallibly, the conveyance direction length of the first planar area 3041 and the second planar area 3042 (L1, L2) is "0.5 mm" or more, preferably "1.0 mm" or more. However, if the conveyance direction length of the first planar area 3041 and the second planar area 3042 (L1, L2) is longer than necessary, the conveyance direction length of the fixing nip portion N (refer to FIG. 2A) will be short and unevenness of pressure tends to occur. To cope with this situation, the length of the slide member 304 itself can be extended to ensure the conveyance direction length of the fixing nip portion N, but such measures are not taken since costs are raised and the size of the fixing apparatus 8 is increased. Moreover, depending on the conveyance length of the first planar area 3041 and the second planar area 3042 (L1, L2), the distance from the most downstream edge of the fixing nip portion N to a most upstream edge of a separation plate (not shown) is extended. The separation plate is arranged downstream of the fixing apparatus 8 to separate the recording material having passed through the fixing nip portion N from the fixing belt 301. The above-mentioned configuration is not preferable since it becomes difficult to separate the recording material from the fixing belt 301.

In view of the above-mentioned points, according to the present embodiment, the conveyance direction length of the first planar area 3041 and the second planar area 3042 is set to "2.0 mm" or less. That is, the first planar area 3041 and the second planar area 3042 are arranged within a range of 0.5 mm or more and 2.0 mm or less from both edges of the slide member 304 in the conveyance direction. In conclusion, the conveyance direction length of the first planar area 3041 and the second planar area 3042 is "0.5 mm or more and 2.0 mm or less", preferably "1.0 mm or more and 1.5 mm or less".

The conveyance direction lengths of the first planar area 3041 and the second planar area 3042 do not have to be the same. The second planar area 3042 arranged upstream of the fixing nip portion N has smaller influence on the separability of the above-mentioned recording material compared to the first planar area 3041 arranged downstream of the fixing nip portion N. Therefore, the conveyance direction length of the second planar area 3042 is preferably longer than that of the first planar area 3041 (L2>L1).

As described, the slide member 304 according to the present embodiment includes the first planar area 3041 and the second planar area 3042 where the projected portions 304*b* are not formed and that do not contact the fixing belt 301 in the range of "0.5 mm or more and 2.0 mm or less" from each of the both edges of the slide member 304 in the conveyance direction. By clamping the first planar area 3041 and the second planar area 3042, the heights of the projected portions 304*b* can be measured correctly in a state where the warping of the slide member 304 is straightened, and scratches and dents are not formed on the projected portions 304*b*. Thus, the occurrence of fixing failures on the recording material caused by the projected portions 304*b* formed on the surface of the slide member 304 can be suppressed without deteriorating the separability of the recording material having passed through the fixing belt 301.

Second Embodiment

Next, a slide member according to a second embodiment will be described based on FIG. 6 with reference to FIGS. 2A and 4. According to the slide member 304 of the first embodiment described above, as illustrated in FIG. 4, the first planar area 3041 and the second planar area 3042 are formed such that the heights thereof are the same as a height from the bottom surface 303*h* of the groove portion 303*f* to a surface 304*a*1 of the base 304*a* in a state where the slide member 304 is retained on the fixing pad 303.

If the recording material contacts the fixing belt 301 at an upstream side or a downstream side of the fixing nip portion N, fixing failures may occur. In order for the recording material not to be in contact the fixing belt 301 even if waving or deformation of the recording material occurs, the fixing belt 301 should be guided away from the pressure roller 305 at the upstream or the downstream of the fixing nip portion N by the fixing pad 303. That is, the upstream-side guide portion 303*c* and the downstream-side guide portion 303*b* of the fixing pad 303 are designed to be positioned away from the pressure roller 305 at the upstream and the downstream of the fixing nip portion N. In that case, however, according to the slide member 304 of the first embodiment described above, the upstream edge portion or the downstream edge portion of the base 304*a* comes to be in contact with the fixing belt 301, which may accelerate wear of the fixing belt 301 and shorten the replacement timing of the fixing belt 301.

Figure 6:
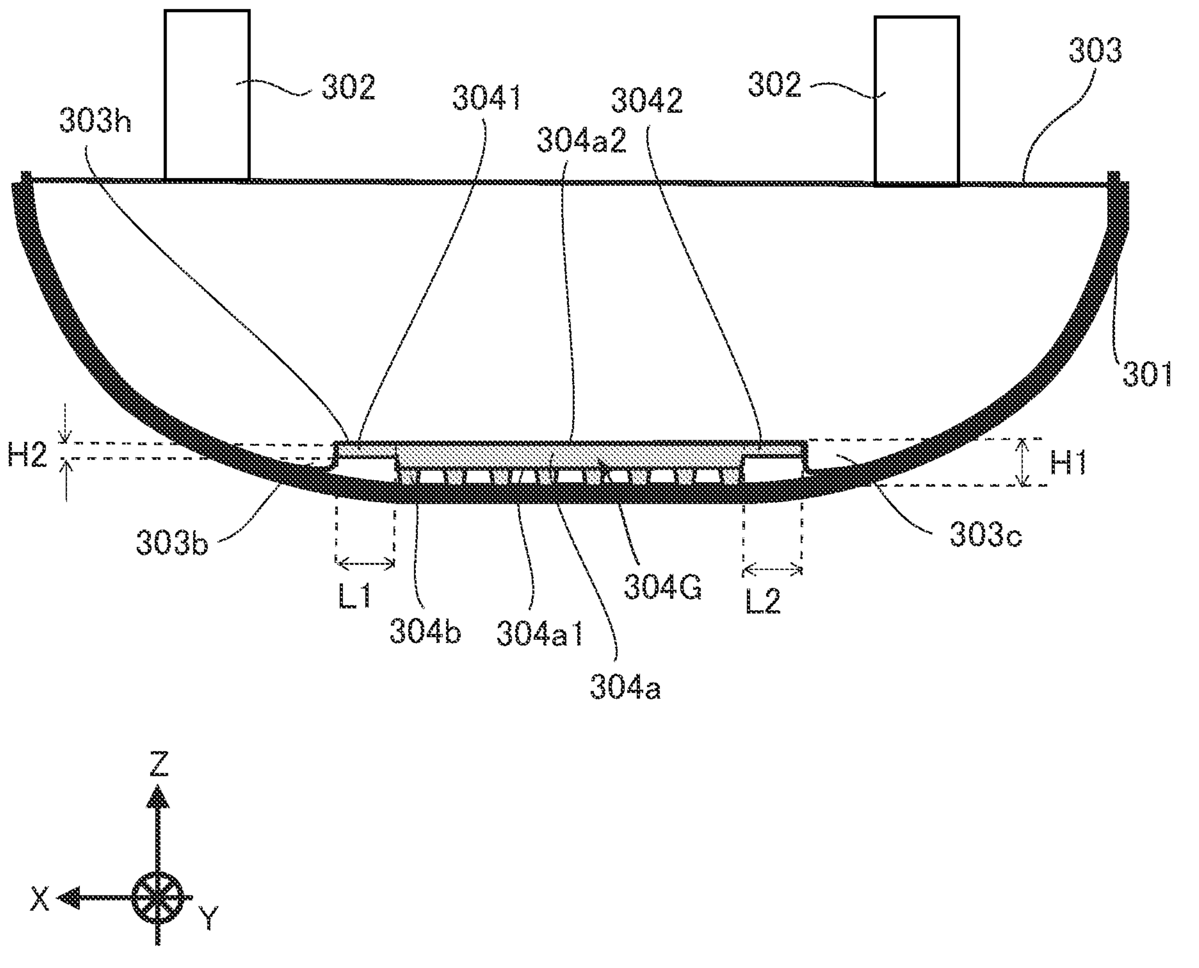
FIG. 6 is a cross-sectional view illustrating a slide member according to a second embodiment.

Therefore, as according to a slide member 304G of the second embodiment illustrated in FIG. 6, the first planar area 3041 and the second planar area 3042 are formed close to the bottom surface 303*h* of the groove portion 303*f* compared to the surface 304*a*1 of the base 304*a* on which the projected portions 304*b* are formed. However, if the thickness of the first planar area 3041 and the second planar area 3042 is made too thin, rigidity is deteriorated, such that the warping of the slide member 304G cannot be straightened when clamped.

In the present embodiment, the first planar area 3041 and the second planar area 3042 are formed to have a thickness (H2) of "30% or more and 70% or less" of a thickness (H1) from a tip of the projected portions 304*b* to an opposite surface 304*a*2 of the base 304*a* on an opposite side of the surface 304*a*1. That is, the first areas (3041, 3042) are formed to have a thickness of 30% or more and 70% or less of a thickness of a portion of the slide member 304 at which one of the plurality of the projected portions 304*b* is provided. For example, if the thickness (H1) from a tip of the projected portions 304*b* to the opposite surface 304*a*2 of the base 304*a* is "1.4 mm", the thickness (H2) of the first planar area 3041 and the second planar area 3042 is "0.5 mm or more and 0.9 mm or less". That is, the first planar area 3041 and the second planar area 3042 are disposed such that the distance from the first planar area 3041 and the second planar area 3042 to the pressure roller 305 is longer than the distance from a part of the slide member 304G opposed to a center portion of the fixing nip portion N to the pressure roller 305. In the direction toward the pressure roller 305 from the fixing pad 303, a downstream end portion of the second area 3045 is protruded toward the pressure roller 305 from downstream end portions of the first areas (3041, 3042).

The thickness of the first planar area 3041 and the second planar area 3042 does not have to be the same. Regarding the second planar area 3042 arranged upstream of the fixing nip portion N, it is less affected by the waving and deformation of the recording material compared to the first planar area 3041 arranged downstream of the fixing nip portion N. Therefore, the thickness of the second planar area 3042 can be made greater than the thickness of the first planar area 3041.

According to this configuration, even in a case where the fixing pad 303 is provided to prevent the recording material from being in contact with the fixing belt 301, an effect of suppressing the occurrence of fixing failures on the recording material caused by the projected portions 304*b* on the slide member 304 can be realized without deteriorating the separability of the recording material.

Third Embodiment

When forming the fixing pad 303 through injection molding, round chamfering is performed to round corners of the tip of projected portions formed in the mold for the groove portion 303*f* to ensure releasability from the mold and to prevent damaging of the mold. Therefore, in the fixing pad 303, a corner portion, that is, a downstream-side continuous portion 303*g*, of the groove portion 303*f* is formed to have a curved shape, that is, arc shape or rounded corner (refer to FIGS. 7 and 8). Further, the groove portion 303*f* is formed longer than the length of the slide member 304 in the conveyance direction, so as to facilitate fitting thereof to the slide member 304.

Comparative Example

If the corner portion of the groove portion 303*f* is formed in a curved shape, as described above, fixing failures of the toner image on the recording material may occur. This point will be described with reference to a slide member 3040 of a comparative example illustrated in FIG. 8.

Figure 8:
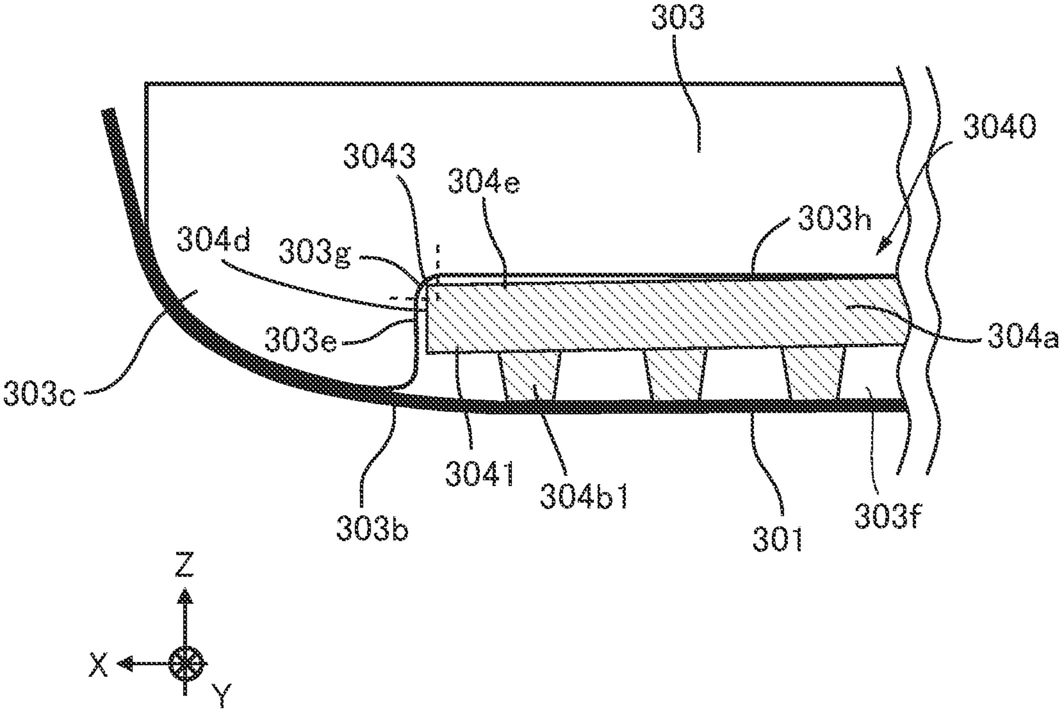
FIG. 8 is a cross-sectional view illustrating a slide member according to a comparative example.

As illustrated in FIG. 8, the fixing pad 303 includes, in the groove portion 303*f*, a flat bottom surface 303*h*, a downstream-side side surface 303*e* that is flat and formed in a direction intersecting the bottom surface 303*h*, i.e., arrow Z direction, downstream in the conveyance direction, i.e., arrow X direction, and a downstream-side continuous portion 303*g*. The bottom surface 303*h* is a surface that comes into contact with an opposite surface 304*e* of the slide member 304 on an opposite side as the slide surface, wherein the downstream-side continuous portion 303*g* is an area corresponding to a corner portion having the curved shape described above, which is connected to the bottom surface 303*h* and the downstream-side side surface 303*e*.

As illustrated in FIG. 8, according to the slide member 3040 of the comparative example, a corner portion 3043 between the opposite surface 304*e* and a downstream-side end surface 304*d* of the base 304*a* is approximately 90 degrees. The slide member 304 includes the first planar area 3041 (refer to the first and second embodiments), and the corner portion 3043 is provided in the first planar area 3041. In the comparative example, if the slide member 3040 moves downstream by sliding against the fixing belt 301, the corner portion 3043 comes into contact with the downstream-side continuous portion 303*g* at an area upstream of the downstream-side side surface 303*e*. That is, in a configuration in which the fixing belt 301 and the pressure roller 305 form the fixing nip portion N for nipping and conveying the recording material (refer to FIG. 2A), the slide member 304 receives force in the pressing direction, arrow Z direction, via the fixing belt 301 from the pressure roller 305. Thereby, the slide member 3040 retained by the fixing pad 303 is pressed against the bottom surface 303*h* of the groove portion 303*f* Then, along with the starting of rotation of the fixing belt 301, frictional force is generated between the fixing belt 301 and the slide member 304. Thereby, the slide member 304 moves downstream by receiving force in the conveyance direction, i.e., arrow X direction, such that the corner portion 3043 of the fixing pad 303 comes into contact with the downstream-side continuous portion 303*g*.

When the corner portion 3043 is moved in contact with the downstream-side continuous portion 303*g*, the slide member 3040 is moved away from the bottom surface 303*h* along the downstream-side continuous portion 303*g*. That is, as illustrated, the slide member 3040 is retained by the fixing pad 303 in a state where a portion of the opposite surface 304*e* is not in contact with the bottom surface 303*h*. This is an unstable state in which a gap is formed between the bottom surface 303*h* of the groove portion 303*f* and the slide member 3040. In this case, a desired nip pressure distribution cannot be obtained in the fixing nip portion N and pressure unevenness tends to occur, according to which fixing failures of toner image on the recording material may occur.

In view of the above point, the present embodiment proposes a configuration in which the slide member 304 is retained in a stable state by the fixing pad 303 even if the corner portion, i.e., the downstream-side continuous portion 303*g*, of the groove portion 303*f* is formed in a curved shape. The present embodiment will be described below based on FIG. 7 with reference to FIG. 2A.

Slide Member

Figure 7:
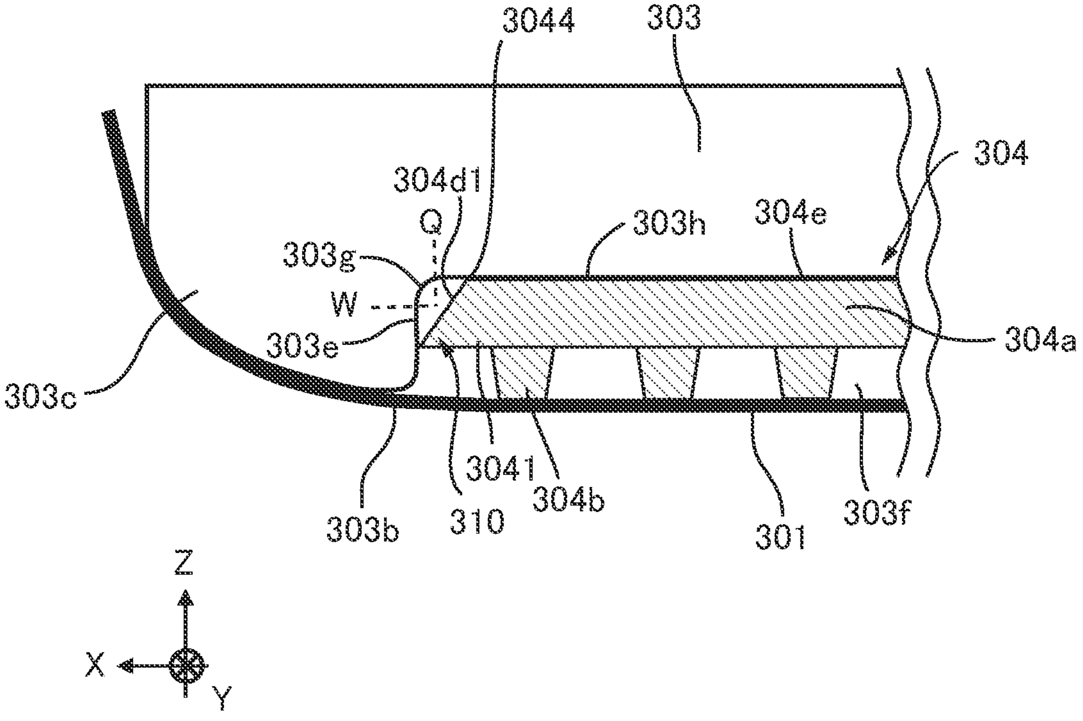
FIG. 7 is a cross-sectional view illustrating a slide member according to a third embodiment.

As illustrated in FIG. 7, the slide member 304 according to the present embodiment includes a downstream-side abutment portion 310 that abuts against the downstream-side side surface 303*e* of the groove portion 303*f* at a position downstream of a downstream edge 3044 of the opposite surface 304*e* in the conveyance direction, i.e., arrow X direction. The downstream-side abutment portion 310 abuts against the downstream-side side surface 303*e* in a state where the downstream edge 3044 of the opposite surface 304*e* is positioned upstream of the downstream-side continuous portion 303*g*, more specifically, positioned upstream of an end of a rounded edge of the rounded corner of the downstream-side continuous portion 303*g*, that is, a boundary Q between the bottom surface 303*h* and end of the curve of the corner portion. Thus, the slide member 304 is in contact with the downstream-side side surface 303*e* and the bottom surface 303*h* at a position out of range of the downstream-side continuous portion 303*g* denoted by the dashed line without coming into contact with the downstream-side continuous portion 303*g*, and retained by the fixing pad 303. The downstream-side abutment portion 310 is provided in the first planar area 3041. That is, the fixing pad 303 includes, in the groove portion 303*f*, the bottom surface 303*h* serving as a bottom surface portion that is in contact with the opposite surface 304*e* of the slide member 304 from the slide surface, the downstream-side side surface 303*e* serving as a side surface portion that is formed on a downstream side of the groove portion 303*f* in the conveyance direction and intersecting the bottom surface 303*h*, and the downstream-side continuous portion 303*g* serving as a continuous portion that is formed between the bottom surface 303*h* and the downstream-side side surface 303*e*. The slide member 304 includes the downstream-side abutment portion 310 serving as an abutment portion configured to abut against the downstream-side side surface 303*e* at a position downstream from a downstream edge of the opposite surface 304*e* in a state where the slide member 304 is slidden against the fixing belt 301 such that the downstream edge of the opposite surface 304*e* is positioned upstream from the downstream-side continuous portion 303*g* in the conveyance direction.

According to the present embodiment, the downstream-side abutment portion 310 is formed by providing a downstream-side end surface of the slide member 304 formed as an inclined surface 304*d*1 that is inclined downstream toward a slide surface, i.e., tip surface of the projected portions 304*b*, from the opposite surface 304*e*. That is, the inclined surface 304*d*1 that is inclined such that a more downstream portion thereof in the conveyance direction is toward the slide surface from the opposite surface 304*e*. Compared to the slide member 3040 (refer to FIG. 8) of the comparative example described above, a corner portion between the opposite surface 304*e* and the downstream-side end surface 304*d*, i.e., the downstream edge 3044, of the base 304*a* is formed as an obtuse angle having an angle greater than 90 degrees. As described, the present embodiment adopts a configuration in which a downstream-side tip of the inclined surface **304*d*1 of the slide member 304 is abutted against the downstream-side side surface 303*e* of the fixing pad 303. The downstream-side abutment portion 310** is preferably formed across the entire sheet-passing area of the fixing nip portion N in the width direction, since the desired fixing nip pressure can be obtained easily.

As described, according to the present embodiment, the downstream-side abutment portion 310 is formed in the slide member 304. In a state where the downstream-side abutment portion 310 is in contact with the downstream-side side surface **303*e* of the fixing pad 303, the slide member 304 is retained by the fixing pad 303 in a state where the downstream edge 3044 of the opposite surface 304*e* is positioned upstream of the downstream-side continuous portion 303*g*. When the slide member 304 is moved downstream along with the starting of rotation of the fixing belt 301, the downstream-side abutment portion 310 abuts against the downstream-side side surface 303*e* before the downstream edge 3044 of the opposite surface 304*e* comes into contact with the downstream-side continuous portion 303*g*, and the slide member 304 is stopped. That is, since the corner portion, i.e., the downstream edge 3044, is not moved while being in contact with the downstream-side continuous portion 303*g*, the slide member 304 will not be separated from the bottom surface 303*h*. Thereby, the slide member 304 is retained by the fixing pad 303 with the entire area of the opposite surface 304*e* in contact with the bottom surface 303*h*. This is a stable state in which no gap is formed between the bottom surface 303*h* of the groove portion 303*f* and the slide member 304**. Accordingly, a desirable nip pressure distribution can be obtained in the fixing nip portion N, and pressure unevenness is not likely to occur, such that as a result, the occurrence of fixing failures of toner image on the recording material can be suppressed.

Other Embodiments

The embodiment described above illustrated an example in which the downstream-side abutment portion 310 is composed of the inclined surface **304*d*1 in which the downstream-side end surface of the slide member 304 is inclined, but the present technique is not limited thereto. For example, a configuration can be adopted in which a protruded downstream-side abutment portion is formed to protrude from the downstream-side end surface of the slide member 304 across the width direction. In that case, the downstream-side abutment portion can abut against the downstream-side side surface 303*e* of the fixing pad 303 at a position more distant from the bottom surface 303*h* than the edge of the rounded corner of the downstream-side continuous portion 303*g*, that is, a boundary W between the downstream-side side surface 303*e* and the end of curve of the corner portion (refer to FIG. 7). The embodiment described above illustrated an example in which the slide member 304 includes the first planar area 3041, but the present technique is not limited thereto. For example, a configuration can be adopted in which the slide member 304 does not include the first planar area 3041**.

According to the embodiment described above, an example is illustrated of a case where the downstream-side abutment portion 310 is formed downstream in the conveyance direction of the slide member 304, but a similar upstream-side abutment portion can also be formed upstream in the conveyance direction thereof. In that case, the description on the downstream-side abutment portion 310 described above with reference to FIG. 7 can be referred to with the term "downstream" replaced by the term "upstream".

The embodiments described above are not limited to the configuration of heating the fixing belt 301, and the present technique is applicable to a configuration in which a pressing belt in the shape of a belt is used instead of the pressure roller 305, wherein the pressing belt is heated by a heater.

The present technique enables to realize a configuration in which projected portions that slide against the fixing belt is formed on the slide member, wherein the occurrence of fixing failures on the recording material caused by the projected portions can be suppressed with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-028923 and 2022-028928, filed on Feb. 28, 2022 which are hereby incorporated by reference herein in their entirety.

What is claimed is:

1. A fixing apparatus comprising:

a fixing belt having an endless shape and configured to rotate;

a slide member including a slide surface configured to slide against an inner circumference surface of the fixing belt;

an opposing member configured to form a fixing nip portion by nipping the fixing belt with the slide member, the fixing nip portion being configured to nip and convey a recording material in a conveyance direction and fix a toner image on the recording material; and a retaining member including a groove portion fitting the slide member therein, the groove portion retaining the slide member, wherein the retaining member contacts the inner circumference surface of the fixing belt at a position downstream from the fixing nip portion in the conveyance direction, wherein the retaining member includes, in the groove portion, a bottom surface portion that is in contact with an opposite surface of the slide member from the slide surface, a side surface portion that is formed on a downstream side of the groove portion in the conveyance direction and intersecting the bottom surface portion, and a continuous portion that is formed between the bottom surface portion and the side surface portion, and wherein the slide member includes an abutment portion configured to abut against the side surface portion at a position downstream from a downstream edge of the opposite surface in a state where the slide member is slidden against the fixing belt such that the downstream edge of the opposite surface is positioned upstream from the continuous portion in the conveyance direction.

2. The fixing apparatus according to claim 1, wherein the continuous portion is a corner portion having a curved shape.

3. The fixing apparatus according to claim 1, wherein the abutment portion includes an inclined surface that is inclined such that a more downstream portion thereof in the conveyance direction is toward the slide surface from the opposite surface.

4. The fixing apparatus according to claim 1, wherein the slide member includes a base on which a plurality of projections that slide against the fixing belt are provided.

5. The fixing apparatus according to claim 4, wherein the retaining member is formed of resin, and wherein the base of the slide member is formed of metal.

6. The fixing apparatus according to claim 5, wherein the slide member includes a low friction layer on a surface of the base that reduces frictional force between the plurality of projections and the fixing belt.

7. The fixing apparatus according to claim 1, wherein in a direction toward the opposing member from the retaining member, a downstream end portion of the retaining member is protruded toward the opposing member from a downstream end portion of the abutment portion.

8. The fixing apparatus according to claim 7, wherein the slide member includes first areas at each of both end portions in the conveyance direction and a second area between the first areas in the conveyance direction, wherein the first areas are provided in a range of 0.5 mm or more and 2.0 mm or less in the conveyance direction from each of both edges of the slide member, and wherein in the direction toward the opposing member from the retaining member, a downstream end portion of the second area is protruded toward the opposing member from downstream end portions of the first areas.

9. The fixing apparatus according to claim 8, wherein the slide member includes a base on which a plurality of projections that slide against the fixing belt are provided, and wherein the first areas are areas where the plurality of projections are not formed and the slide member is not in contact with the fixing belt.

10. The fixing apparatus according to claim 9, wherein the first areas are formed to have a thickness of 30% or more and 70% or less of a thickness of a portion of the slide member at which one of the plurality of projections is provided.

* * * * *